US012159982B2

(12) United States Patent
Kurihara

(10) Patent No.: US 12,159,982 B2
(45) Date of Patent: Dec. 3, 2024

(54) POWER SUPPLY DEVICE

(71) Applicant: SANYO Electric Co., Ltd., Osaka (JP)

(72) Inventor: Hidemi Kurihara, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 949 days.

(21) Appl. No.: 17/048,187

(22) PCT Filed: Apr. 10, 2019

(86) PCT No.: PCT/JP2019/015582
§ 371 (c)(1),
(2) Date: Oct. 16, 2020

(87) PCT Pub. No.: WO2019/208219
PCT Pub. Date: Oct. 31, 2019

(65) Prior Publication Data
US 2021/0159553 A1 May 27, 2021

(30) Foreign Application Priority Data
Apr. 25, 2018 (JP) ................. 2018-084555

(51) Int. Cl.
H01M 10/44 (2006.01)
H01M 10/42 (2006.01)
(Continued)

(52) U.S. Cl.
CPC ....... H01M 10/44 (2013.01); H01M 10/4257 (2013.01); H01M 50/213 (2021.01);
(Continued)

(58) Field of Classification Search
CPC . H01M 10/44; H01M 10/4257; H01M 50/247
See application file for complete search history.

(56) References Cited

U.S. PATENT DOCUMENTS 10,673,106 B2 * 6/2020 Suzuki ................. H01M 10/46
2015/0079444 A1 * 3/2015 Baumgartner ........ H01M 50/24
429/120

FOREIGN PATENT DOCUMENTS

CN 104600394 A 5/2015
EP 2849250 A1 3/2015
(Continued)

OTHER PUBLICATIONS

The Extended European Search Report dated Jun. 10, 2021, issued in counterpart EP Application No. 19792146.3. (7 pages).
(Continued)

Primary Examiner — Karie O'Neill Apicella
(74) Attorney, Agent, or Firm — WHDA, LLP

(57) ABSTRACT

The power supply device includes: battery block in which a plurality of secondary battery cells is connected in series and/or in parallel to each other; circuit board on which a protection circuit that protects secondary battery cells constituting battery block is mounted; and exterior case that houses battery block and circuit board. Exterior case has facing part that directly faces circuit board thicker than at least a portion of a non-facing part that is another part. Accordingly, forming the part directly facing circuit board in exterior case so as to be relatively thick makes it possible to improve heat resistance and reduce influence on the outside when circuit board reaches a high temperature.

9 Claims, 9 Drawing Sheets

(51) Int. Cl.
*H01M 50/213* (2021.01)
*H01M 50/247* (2021.01)
*H01M 50/284* (2021.01)
*H02J 7/00* (2006.01)

(52) U.S. Cl.
CPC ....... *H01M 50/247* (2021.01); *H01M 50/284* (2021.01); *H01M 2010/4271* (2013.01); *H01M 2220/30* (2013.01); *H02J 7/0013* (2013.01); *H02J 7/0029* (2013.01)

(56) References Cited

FOREIGN PATENT DOCUMENTS

| EP | 3306703 | A1 | 4/2018 | | |
|----|---------|----|--------|----|----|
| JP | 2012-186038 | | 9/2012 | | |
| JP | 2012-209135 | | 10/2012 | | |
| JP | 2012209135 | A | * 10/2012 | .............. | H01M 2/10 |

OTHER PUBLICATIONS

English Translation of Office Action dated May 7, 2022, issued in counterpart top CN No. 201980027970.1. (3 pages).
International Search Report of PCT application No. PCT/JP2019/015582 dated Jul. 9, 2019.

* cited by examiner

POWER SUPPLY DEVICE

CROSS-REFERENCE TO RELATED APPLICATIONS

This application is a U.S. national stage application of the PCT International Application No. PCT/JP2019/015582 filed on Apr. 10, 2019, which claims the benefit of foreign priority of Japanese patent application No. 2018-084555 filed on Apr. 25, 2018, the contents all of which are incorporated herein by reference.

TECHNICAL FIELD

The present invention relates to a power supply device containing a large number of secondary battery cells.

BACKGROUND ART

A battery pack having a plurality of secondary battery cells housed in an exterior case is used as a power source for a cordless portable electric device (see, for example, PTL 1). In this battery pack, the plurality of secondary battery cells is connected in series or in parallel to increase the capacity. Particularly in recent years, there has been a demand for higher capacity of battery packs.

With such an increase in capacity of the battery pack, the amount of heat generated by a circuit board on which a protection circuit for protecting the secondary battery cells is mounted tends to increase. If the circuit board reaches a high temperature for some reason, it is necessary to suppress the transfer of high heat to outside of the exterior case. Therefore, in conventional battery packs, the thickness of the exterior case is increased to improve the heat insulating property.

On the other hand, battery packs are also required to decrease in size and weight from the viewpoint of portability. However, if the thickness of the exterior case is increased to improve the heat insulating property, the weight of the exterior case becomes heavy, which in turn leads to an increase in weight of the electric device to which the battery pack is connected.

CITATION LIST

Patent Literature

PTL 1: Unexamined Japanese Patent Publication No. 2012-186038

SUMMARY OF THE INVENTION

The present invention has been made in view of such a background, and one of the objects thereof is to provide a power supply device with increase in weight suppressed while enhancing safety of an exterior case housing a plurality of secondary battery cells and a circuit board.

A power supply device according to a first aspect of the present invention is a power supply device including: a battery block in which a plurality of secondary battery cells is connected in series and/or in parallel to each other; a circuit board on which a protection circuit that protects the plurality of secondary battery cells constituting the battery block is mounted; and an exterior case that houses the battery block and the circuit board, wherein a facing part of the exterior case that directly faces the circuit board is formed to be thicker than at least a portion of a non-facing part that is another part. According to the above configuration, forming the part directly facing the circuit board in the exterior case so as to be relatively thick makes it possible to improve heat resistance and reduce influence on the outside when the circuit board reaches a high temperature.

In a power supply device according to a second side surface, in addition to the above configuration, an inner surface of the exterior case in which the battery block and the circuit board are housed is formed in a planar shape, and at least a portion of the non-facing part on an outer surface side of the exterior case exposed to an outside has a thin region that is recessed to be thinner than the facing part. According to the above configuration, the exterior case is formed such that the part directly facing the circuit board without any interposed member is relatively thick and the surface of the non-facing part as the other part is thin so that it is possible to improve the design and the functionality due to its easiness to grip by hand.

In a power supply device according to a third aspect, in addition to any of the above configurations, the exterior case is divided into a first case and a second case, and a joint surface between the first case and the second case is positioned at the non-facing part. According to the above configuration, the joint surface between the first case and the second case is separated from the circuit board, so that even if the circuit board reaches a high temperature, it is possible to avoid propagation of the high temperature from the joint surface to the outside, thereby enhancing the safety.

In a power supply device according to a fourth aspect, in addition to any of the above configurations, the joint surface between the first case and the second case is formed to be thicker than the thin region. According to the above configuration, the joint surface between the first case and the second case can be increased in mechanical strength.

In a power supply device according to a fifth aspect, in addition to any of the above configurations, the joint surface between the first case and the second case is formed to be the same in thickness as the facing part. According to the above configuration, it is possible to thicken the important parts from which heat is likely to leak to the outside, such as the part directly facing the circuit board and the joint surface between the first case and the second case, to enhance the safety even if the circuit board reaches a high temperature, and thin the other regions to achieve light weight.

In a power supply device according to a sixth aspect, in addition to any of the above configurations, the exterior case is formed in a prismatic shape extended in one direction, and the exterior case is divided into a first case and a second case in the extending direction. According to the above configuration, even if the circuit board housed in the first case and the second case divided in the extending direction reaches a high temperature, it is possible to effectively suppress leakage of heat to the outside of the exterior case.

In a power supply device according to a seventh aspect, in addition to any of the above configurations, the facing part is a region in proximity to a plate-shaped end edge of the circuit board. According to the above structure, thickening the region facing the end edge of the circuit board in the exterior case makes it possible to effectively suppress leakage of heat to the outside of the exterior case when the circuit board reaches a high temperature.

A power supply device according to an eighth aspect, in addition to any of the above configurations, further includes a battery holder that holds the plurality of secondary battery cells, the circuit board being placed on one surface of the battery holder.

A power supply device according to a ninth aspect is a battery pack that is connected to a portable electric device and supplies electric power.

DESCRIPTION OF EMBODIMENT

Figure 1:
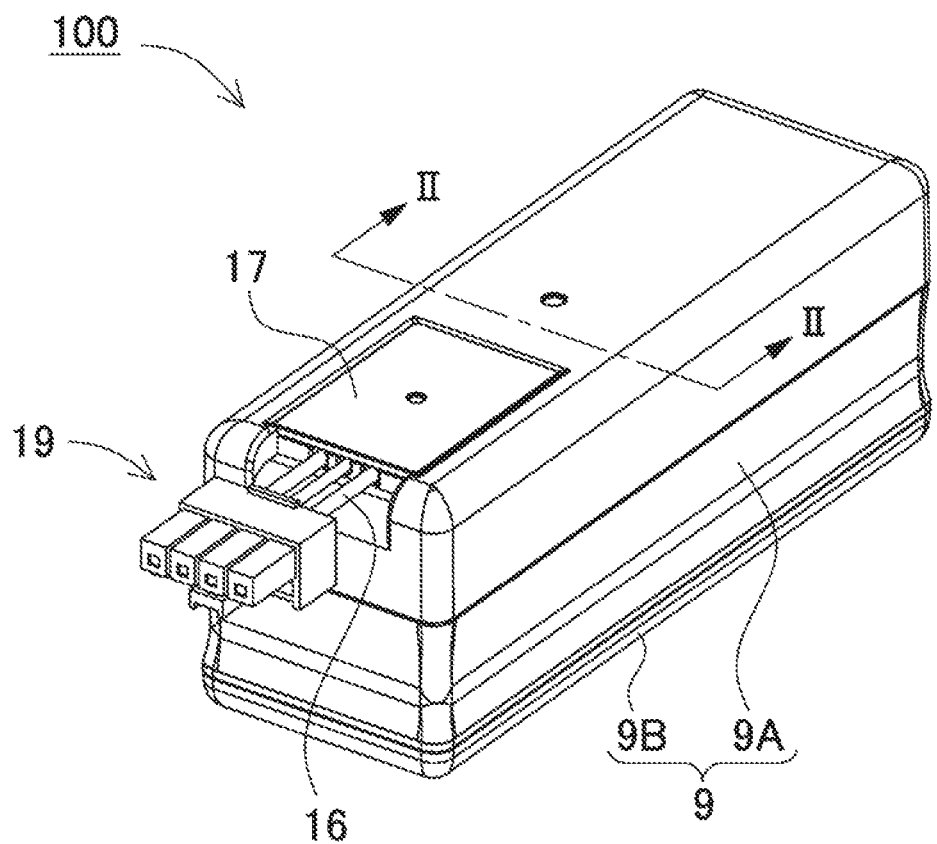
FIG. 1 is a perspective view of a battery pack according to an exemplary embodiment of the present invention.

Hereinafter, a power supply device according to an exemplary embodiment of the present invention will be described in detail with reference to the drawings. In the following description, terms to denote specific directions or positions (e.g., "top", "bottom", and other terms including those terms) are used as necessary for easy understanding of the invention with reference to the drawings, and the technical scope of the present invention is not limited by the meanings of the terms. The parts having the same reference numerals appearing in a plurality of drawings indicate the same or equivalent parts or members.

The exemplary embodiment described below is specific examples of the technical idea of the present invention, and the present invention is not limited to the following exemplary embodiment. The dimensions, materials, shapes, relative arrangements, and the like of the components described below are not intended to limit the scope of the present invention thereto but are intended for exemplification, unless specifically stated. The contents described in relation to one exemplary embodiment and example can be applied to other exemplary embodiments and examples. The sizes and positional relationships of members shown in the drawings may be exaggerated in order to clarify the explanation.

In the power supply device shown in the following drawings, a plurality of battery blocks is electrically connected and physically coupled by a circuit board. In each of the battery blocks, a plurality of secondary battery cells is arranged at fixed positions by a battery holder, and the secondary battery cells are connected by lead plates. In the battery blocks, terminal parts to be connected to the circuit board are arranged at the same position and are commonized. The circuit board is provided with connection parts that connect and couple the terminal parts of the battery blocks. In the power supply device, the terminal parts of the battery blocks are coupled to the connection parts of the circuit board so that the plurality of battery blocks is connected in series or in parallel.

The power supply device is used as a power source for a portable electric device such as a vacuum cleaner. In the present invention, however, there is no limitation on the specific electric device for which the power supply device is used. The present invention can also be used as a power source for other electric devices such as an electric power tool and a power-assisted bicycle. Further, the power supply device can be structured to be detachably attached to an electric device, or can be applied to a mode in which the power supply device is incorporated in an electric device in a non-detachable state.

Figure 2:
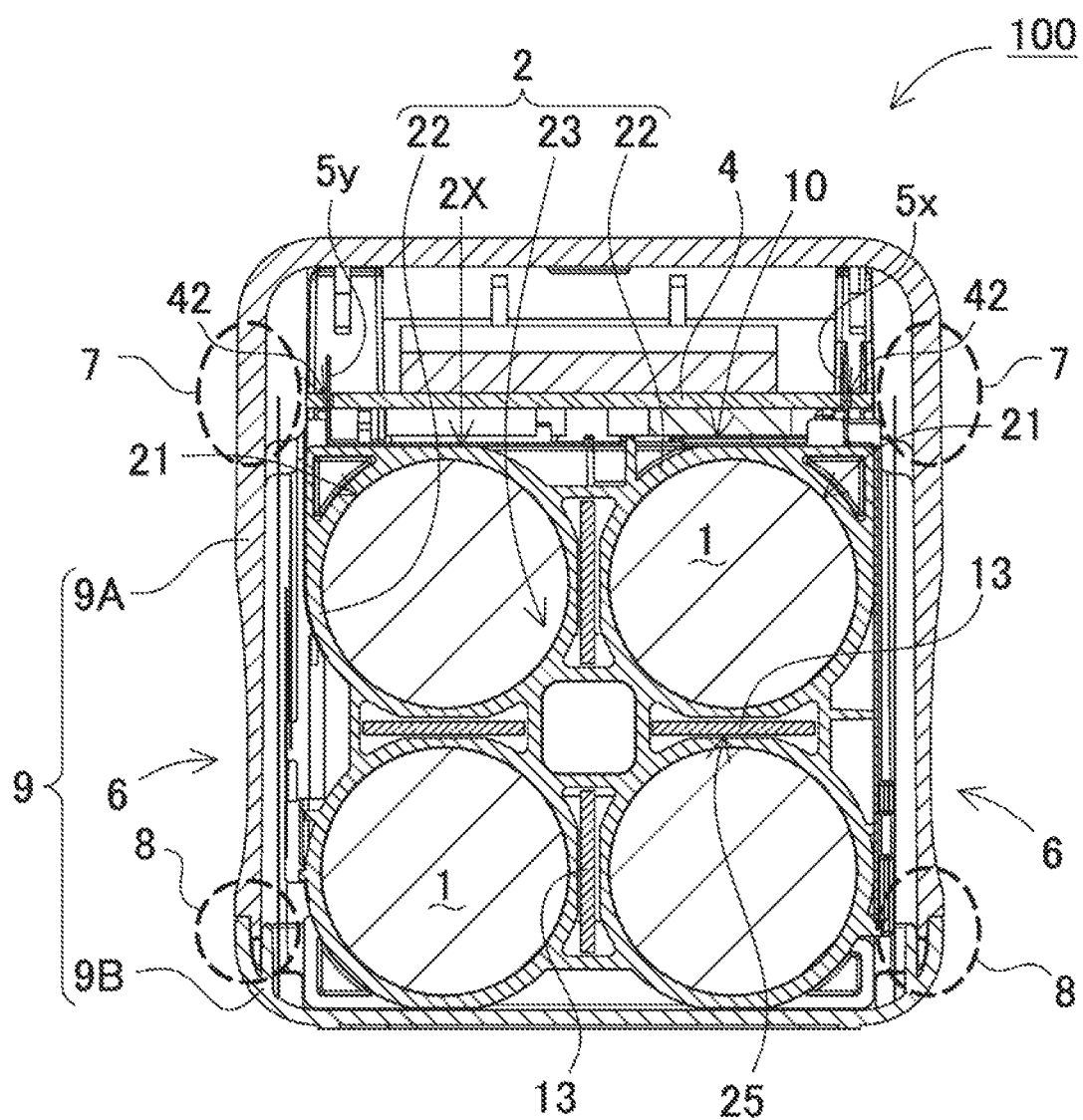
FIG. 2 is a cross-sectional view of the battery pack shown in FIG. 1 taken along line II-II.
Figure 3:
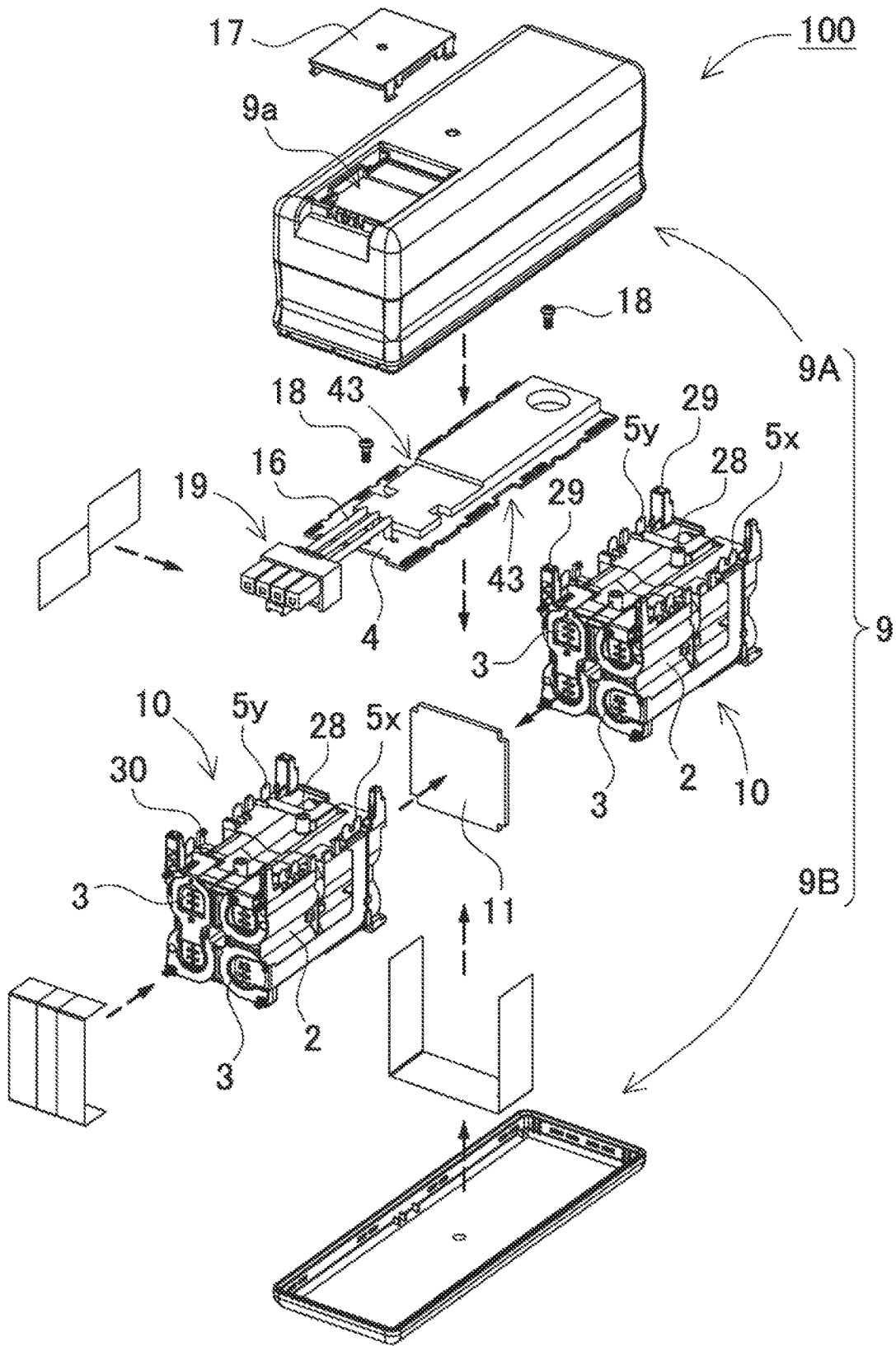
FIG. 3 is an exploded perspective view of the battery pack shown in FIG. 1.
Figure 4:
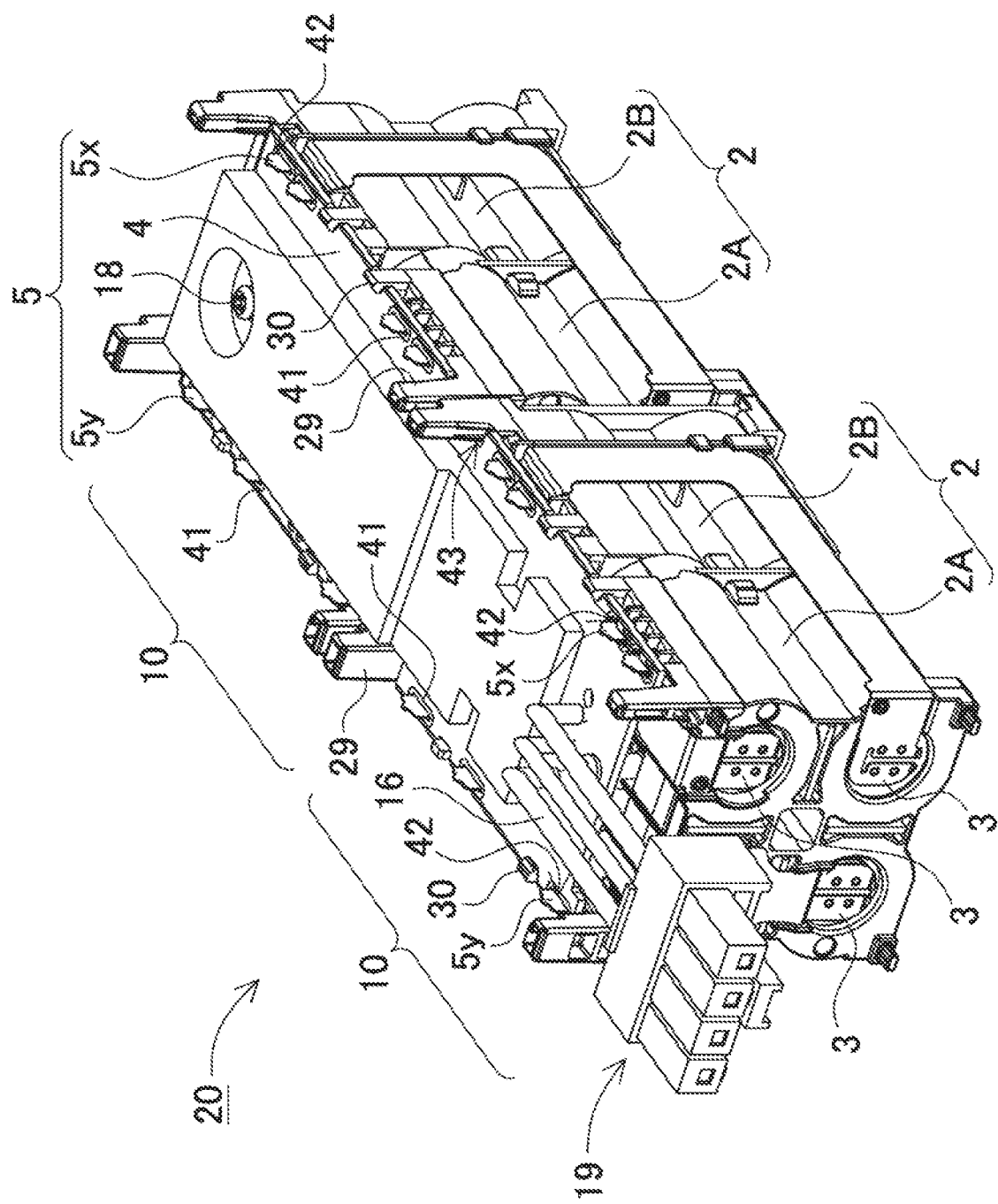
FIG. 4 is a perspective view of a core pack in which two battery blocks and a circuit board are coupled.
Figure 5:
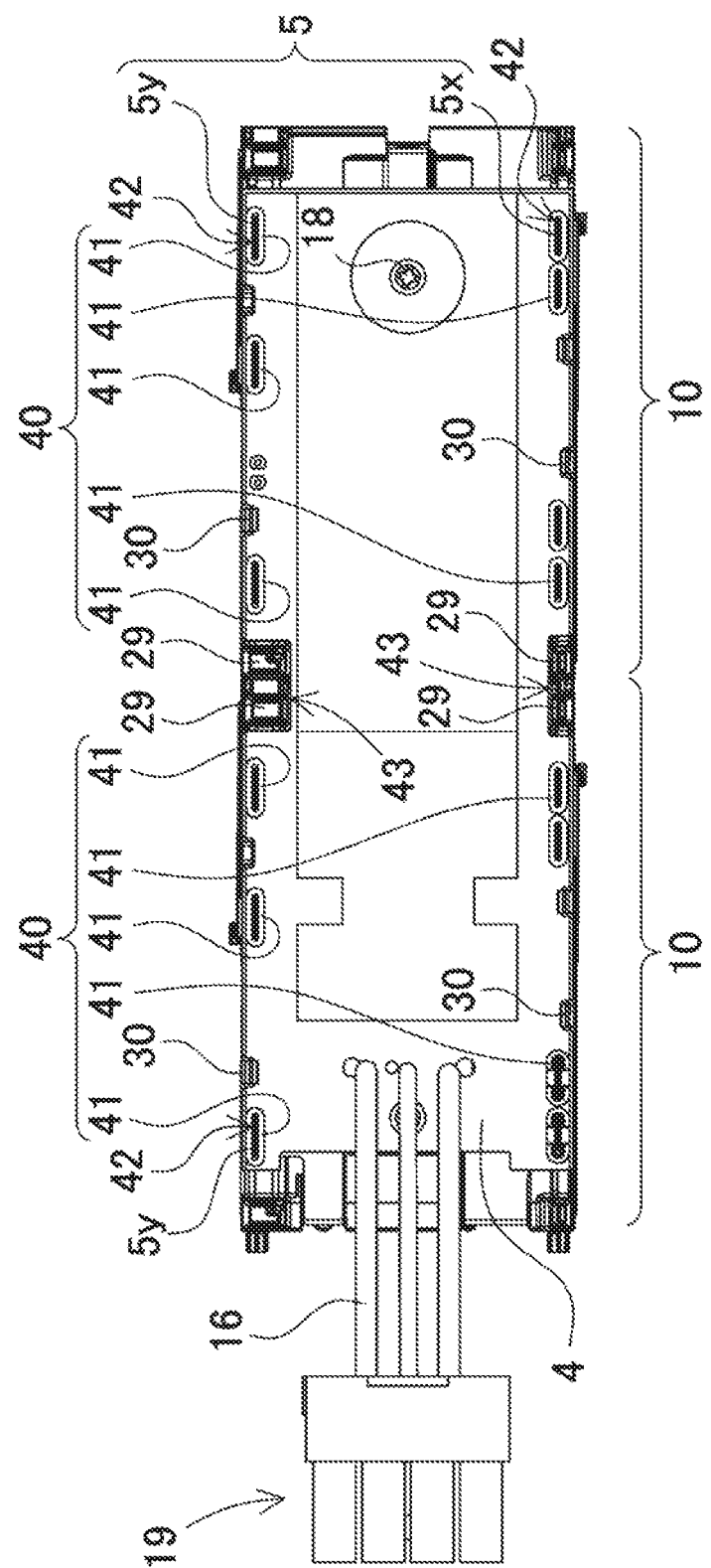
FIG. 5 is a plan view of the core pack shown in FIG. 4.
Figure 6:
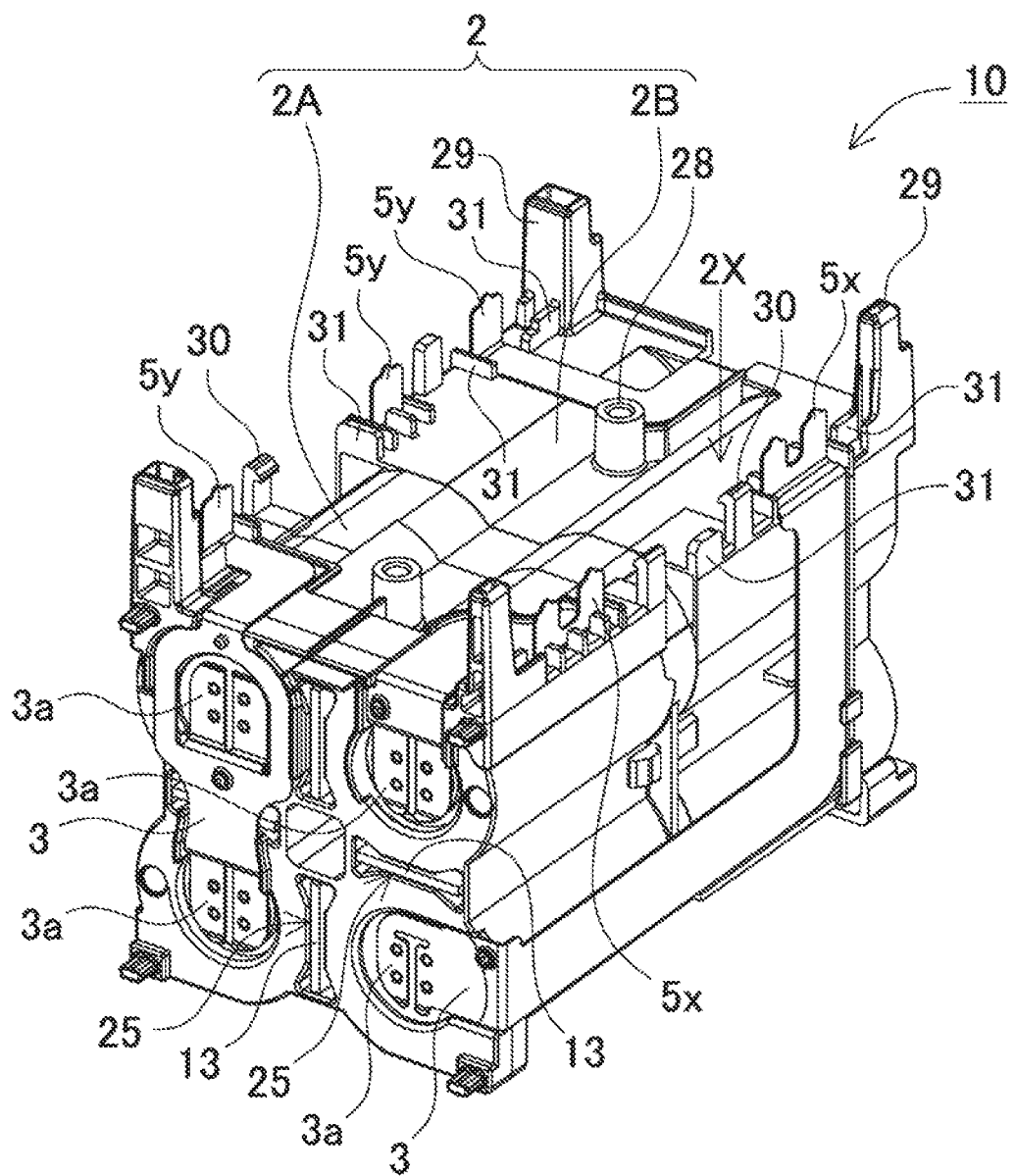
FIG. 6 is a perspective view of the battery block.
Figure 7:
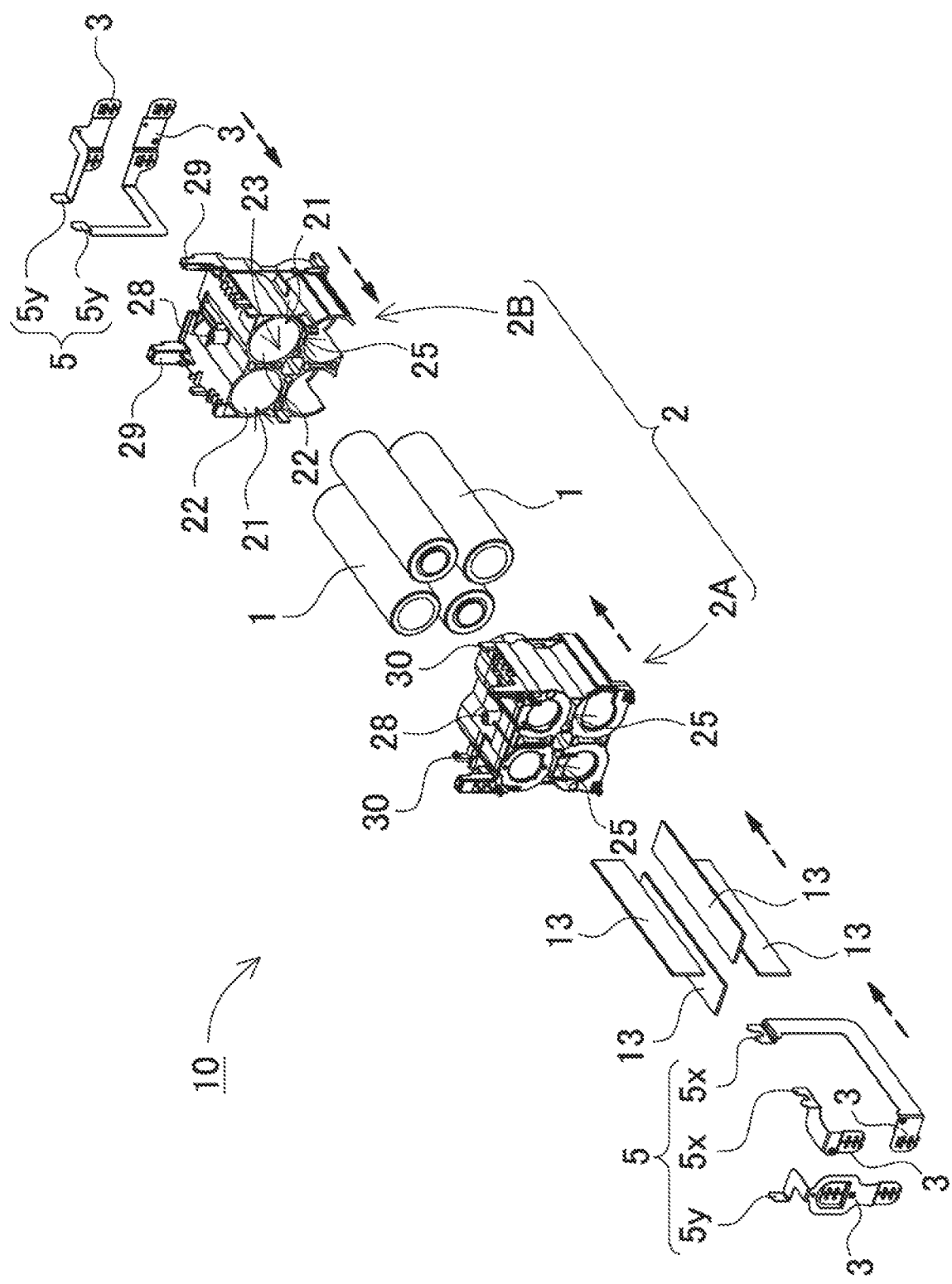
FIG. 7 is an exploded perspective view of the battery block shown in FIG. 6.

As a power supply device according to an exemplary embodiment of the present invention, a battery pack for a portable electric device is shown in FIGS. 1 to 7 described below. FIG. 1 is a perspective view of the battery pack, FIG. 2 is a vertical cross-sectional view of the battery pack, and FIG. 3 is an exploded perspective view of the battery pack. FIGS. 4 and 5 are respectively a perspective view and a plan view of a core pack in which battery blocks and a circuit board contained in a battery pack are coupled, and FIGS. 6 and 7 are respectively a perspective view and an exploded perspective view of the battery block, respectively.

Battery pack 100 includes a plurality of battery blocks 10 and circuit board 4. In the battery pack of FIG. 3, two battery blocks 10 are coupled to circuit board 4. The battery pack according to the present exemplary embodiment is not specific to two battery blocks 10, but three or more battery blocks 10 can be coupled to circuit board 4 although not shown. Battery block 10 includes a plurality of secondary battery cells 1 and battery holder 2 in which secondary battery cells 1 are arranged in a parallel posture. In the battery pack of FIG. 3, two battery blocks 10 are coupled to circuit board 4 and housed in exterior case 9.

Exterior Case 9

Battery pack 100 is formed in a rectangular tubular box shape as shown in FIGS. 1 to 3. Exterior case 9 shown in the drawings is divided into two parts, first case 9A and second case 9B. Exterior case 9 has connector 19 drawn to the outside for connecting with a portable device that is to be supplied power from battery pack 100. Exterior case 9 is made of a material having excellent electrical insulating properties and thermal insulating properties, such as polycarbonate, ABS, or a resin obtained by combining them.

Exterior case 9 stores, as shown in FIG. 3, two battery blocks 10, insulating plate 11 disposed between battery blocks 10, and circuit board 4 coupling battery blocks 10. As shown in FIGS. 6 and 7, battery block 10 has a plurality of secondary battery cells 1 arranged in parallel posture with battery holder 2. In illustrated battery block 10, four secondary battery cells 1 are arranged in two rows and two stages in battery holder 2. Secondary battery cell 1 uses a cylindrical battery having a cylindrical exterior can. In illustrated battery block 10, four secondary battery cells 1 are arranged in two rows and two stages, and secondary battery cells 1 are connected in series by lead plates 3. In battery block 10 shown in the drawings, four secondary battery cells 1 are arranged in two rows and two stages and connected in series. However, a number and connection form of secondary battery cells 1 can be freely changed.

Secondary battery cell 1 is a lithium ion secondary battery. However, secondary battery cell 1 can be a non-aqueous electrolyte secondary battery other than a lithium-ion secondary battery. The cylindrical secondary battery cell may be a rechargeable secondary battery such as a nickel metal hydride battery or a nickel cadmium battery, especially a battery that generates heat at high temperatures when being used.

Insulating Plate 11

As shown in FIG. 3, exterior case 9 has insulating plate 11 disposed between battery blocks 10. Insulating plate 11 is disposed between battery blocks 10 arranged side by side in a longitudinal direction of exterior case 9. This insulating plate 11 is an inorganic plate made from a material having excellent insulating properties and heat insulating properties such as a mica plate.

Battery Block 10

In battery block 10, four secondary battery cells 1 are arranged at fixed positions in plastic battery holder 2, and secondary battery cells 1 are connected in series by lead plates 3. In battery block 10 shown in FIGS. 6 and 7, secondary battery cells 1 are connected in series by lead plates 3 to increase an output voltage. However, battery block 10 may have secondary battery cells 1 connected in parallel by lead plates 3 or may have battery cells 1 connected in series and in parallel by lead plates 3. Although a plurality of battery blocks 10 is connected to circuit board 4, battery blocks 10 can be commonized by arranging secondary battery cells 1 of the same outer shape, for example, cylindrical batteries of the same dimensions, at fixed positions in battery holder 2 of the same shape and connecting secondary battery cells 1 by lead plates 3 of the same shape. Battery blocks 10 in which all the components are commonized can be mass-produced particularly inexpensively.

Battery block 10 is provided with protruding terminal parts 5 for connecting to circuit board 4. In battery blocks 10, terminal parts 5 are arranged at the same position and are commonized. Battery blocks 10 of FIGS. 4 to 7 are each provided with five terminal parts 5 including positive and negative output terminals 5x and three voltage detection terminals 5y. With five terminal parts 5 coupled to connection parts 41 of circuit board 4, one battery block 10 is connected to circuit board 4. In this circuit board 4, as shown in FIG. 5, connection parts 41 provided at five locations are used as one connection part unit 40, and one battery block 10 is coupled to one connection part unit 40. In the battery pack shown in the drawing, since two battery blocks 10 are coupled to circuit board 4, circuit board 4 has two connection part units 40, that is, connection parts 41 at the five locations as one connection part unit 40, in total, connection parts 41 at ten locations in two connection part units 40. Each connection part unit 40 has a plurality of connection parts 41 arranged at the same position to couple terminal parts 5 of corresponding battery block 10. In the battery pack shown in the drawing, since two battery blocks 10 are coupled, circuit board 4 is provided with two connection part units 40 to couple terminal parts 5 of two battery blocks 10. In the battery pack, three or more battery blocks 10 can be coupled to circuit board 4. Three or more battery blocks 10 may be connected in series via circuit board 4 or connected in parallel, or four or more battery blocks 10 may be coupled to circuit board 4 and connected in series and in parallel.

Circuit board 4 shown in the drawing has through-holes 42 into which terminal parts 5 are to be inserted, and opening edge parts of through-holes 42 serve as connection parts 41 for terminal parts 5. In circuit board 4, terminal parts 5 are inserted into the through-holes and soldered so that terminal parts 5 are coupled to connection parts 41. Terminal parts 5 inserted into through-holes 42, soldered and coupled to connection parts 41 are electrically connected to circuit board 4 in an ideal state and physically coupled.

Battery Holder 2

In battery holder 2 of FIGS. 6 and 7, the plurality of secondary battery cells 1 is arranged in a parallel posture with terminal surfaces at both ends arranged on the same plane. Battery holder 2 has the plurality of secondary battery cells 1 arranged in multiple stages and multiple rows. Battery holder 2 shown in the drawings is molded from plastic into a shape having holding tubes 22 in which four secondary battery cells 1 are arranged at fixed positions. Battery holder 2 has a shape in which four holding tubes 22 are coupled in a parallel posture in two rows and two stages, and insides of holding tubes 22 are substantially equal to outer shapes of secondary battery cells 1 to form holding part 21.

Battery holder 2 shown in the perspective view of FIG. 6 has fitting convex parts 29 projecting from fixed surface 2X (upper surface in the drawing) facing circuit board 4. Fitting convex parts 29 are hollow columnar bosses that vertically project upward from four corners of fixed surface 2X, and are molded integrally with the plastic of battery holder 2. Fitting convex parts 29 are formed in a tapered shape with an upper constriction, and guide fitting concave parts 43 provided in circuit board 4 to dispose circuit board 4 at a fixed position as shown in FIG. 4. Battery holder 2 shown in FIG. 6 further has mounting ribs 31 integrally molded for mounting circuit board 4 thereon at a plurality of positions on fixed surface 2X and specifying vertical position of circuit board 4. Mounting ribs 31 are provided at a plurality of positions on both sides of fixed surface 2X of battery holder 2, and circuit board 4 is mounted thereon and arranged at a fixed position. Battery blocks 10 of FIG. 6 has locking hooks 30 for circuit board 4 integrally molded and provided on fixed surface 2X of battery holder 2. As shown in FIG. 4, locking hooks 30 lock circuit board 4 set at a fixed position and disposes it at the fixed position. In circuit board 4, terminal parts 5 of battery blocks 10 are inserted into through-holes 42 of circuit board 4, fitting convex parts 29 of battery holder 2 are guided to fitting concave parts 43, and a bottom surface is mounted on mounting ribs 31, arranged at a fixed position, and locked by locking hooks 30, so that circuit board 4 is arranged at the fixed position. With circuit board 4 set at the fixed position by locking hooks 30, terminal parts 5 of battery blocks 10 are soldered to connection parts 41 of circuit board 4 to couple battery blocks 10.

Battery block 10 shown in FIG. 7 has battery holder 2 divided into first battery holder 2A and second battery holder 2B in the longitudinal direction of secondary battery cells 1. Battery holder 2 allows smooth insertion of elongated secondary battery cells 1. First battery holder 2A and second battery holder 2B are separately manufactured by molding plastic, and are coupled to each other after secondary battery cells 1 are inserted. First battery holder 2A and second battery holder 2B each have cylindrical holding tubes 22 for inserting cylindrical secondary battery cells 1 and arranging the same at fixed positions. An inner shape of holding tubes 22 is substantially the same as an outer shape of secondary battery cell 1, and to be exact, the inner shape of holding tubes 22 is slightly larger to smoothly insert and arrange secondary battery cells 1 at fixed positions. First battery holder 2A and second battery holder 2B of this structure are coupled to each other at fixed positions with secondary battery cells 1 therebetween in a state where both ends of cylindrical secondary battery cells 1 are inserted. First battery holder 2A and second battery holder 2B can be more accurately coupled to each other with opposing surfaces as a fitting structure, and are also coupled together at fixed positions with a non-melting plate described later. First battery holder 2A and second battery holder 2B, which are coupled via secondary battery cells 1, are coupled to circuit board 4 and are held in a mutually coupled state.

Battery block 10 shown in FIGS. 2 and 7 has holding tubes 22 arranged between adjacent secondary battery cells 1 as partition walls 23, and non-melting plates 13 such as mica plates arranged inside partition walls 23. In illustrated battery holder 2, since secondary battery cells 1 are arranged in two rows and two stages, cross-shaped partition wall 23 is provided between four secondary battery cells 1 arranged vertically and horizontally. Partition walls 23 are provided with insertion gaps 25 into which non-melting plates 13 inside are to be inserted. Partition walls 23 have non-melting plates 13 such as mica plates inserted in insertion gaps 25. In this battery block 10, even if any of secondary battery cells 1 causes thermal runaway and generates abnormal heat, it is possible to prevent thermal runaway from being induced in adjacent secondary battery cells 1.

Lead Plates 3

Figure 8:
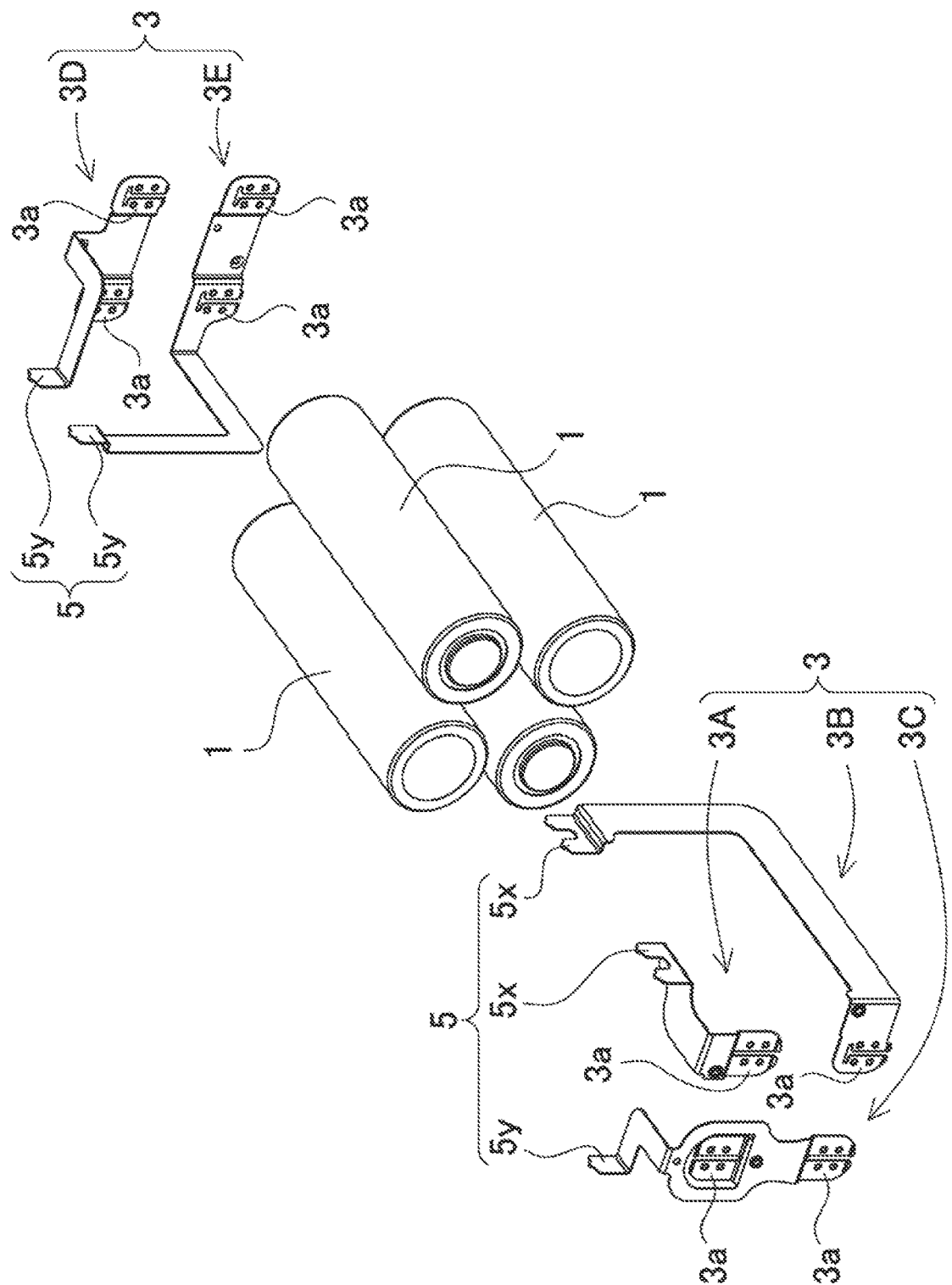
FIG. 8 is an exploded perspective view of a connected state of secondary battery cells and lead plates.

Secondary battery cells 1 of battery blocks 10 are electrically connected in series by lead plates 3. Lead plate 3 is formed by bending a metal plate having excellent conductivity. Lead plates 3 are welded and fixed to electrodes provided on the end surfaces of secondary battery cells 1. FIG. 8 shows a state where lead plates 3 connect secondary battery cells 1 in one battery block 10. This drawing shows a state in which lead plates 3 are separated from secondary battery cells 1 and battery holder 2 is removed in order to make a connection state of lead plates 3 easy to understand. Although this drawing shows one battery block 10, battery blocks 10 connected to circuit board 4 have secondary battery cells 1 connected in the same state by lead plates 3 of the same shape.

As shown in FIG. 8, battery blocks 10 has four secondary battery cells 1 connected in series by five lead plates 3 and has output terminals 5x provided by lead plates 3. Five lead plates 3 have welded parts 3a provided on the electrodes of secondary battery cells 1. Welded parts 3a is provided with welding spots on both sides of a slit in order to reduce reactive current in spot welding. Welding spots are projected and fixed by spot welding to the electrodes of secondary battery cells 1. Battery block 10 includes first to fifth lead plates 3. First lead plate 3A and second lead plate 3B each have one end as welded part 3a and the other end as output terminal 5x of battery block 10. Third lead plate 3C, fourth lead plate 3D, and fifth lead plate 3E are each provided with a pair of welded parts 3a and voltage detection terminal 5y. The pair of welded parts 3a are connected to the electrodes of adjacent secondary battery cells 1 and connect adjacent secondary battery cells 1 in series. Output terminals 5x and voltage detection terminals 5y provided at end parts of lead plates 3 are arranged at fixed positions in battery holder 2. With welded parts 3a fixed to the electrodes of secondary battery cells 1, output terminals 5x and voltage detection terminals 5y project from fixed surface 2X of battery block 10.

Battery block 10 shown in FIGS. 6 to 8 is provided with terminal parts 5 at the end parts of lead plates 3. Battery block 10 is coupled to circuit board 4 by soldering terminal parts 5 provided at the end parts of lead plates 3 to circuit board 4. In battery block 10 of FIG. 6, output terminals 5x of battery block 10 are arranged on one side of battery holder 2, and voltage detection terminals 5y for detecting the voltage of secondary battery cells 1 are arranged on the other side. As shown in FIGS. 4 and 5, battery blocks 10 are each physically coupled to circuit board 4 by coupling terminal parts 5 including output terminals 5x and voltage detection terminals 5y to circuit board 4. Battery blocks 10 with terminal parts 5 on both sides coupled to circuit board 4 are stably coupled to circuit board 4.

Circuit Board 4

Circuit board 4 couples the plurality of battery blocks 10, electrically connect battery blocks 10, and further physically couples battery blocks 10. In battery pack 100 shown in the exploded perspective view of FIG. 3, circuit board 4 is screwed to two battery blocks 10 with set screws 18 penetrating circuit board 4 to further firmly couple the plurality of battery blocks 10. Battery blocks 10 each have fixing bosses 28 into which set screws 18 are to be screwed on fixed surface 2X of battery holder 2. Output terminals 5x of each battery block 10 are connected via circuit board 4 and further connected to connector 19. Circuit board 4 is provided with a conductive layer (not shown) such as a copper foil on its surface. The conductive layer electrically connects connection parts 41 for output terminals 5x to connect battery blocks 10 in series, and also connects output terminals 5x to lead wire 16 of the connector 19. The conductive layer further connects connection parts 41 for the voltage detection terminals 5y to a protection circuit of circuit board 4. Circuit board 4 is mounted with the protection circuit that charges and discharges secondary battery cells 1, and connects each secondary battery cell 1 to the protection circuit. The protection circuit detects the voltage and current of each secondary battery cell 1 and controls the current for charging/discharging to protect the battery while charging/discharging.

In battery pack 100 described above, secondary battery cells 1 of each battery block 10 are connected in series by lead plates 3 to increase an output voltage of battery block 10. However, battery block 10 may have secondary battery cells 1 connected in parallel or in series and in parallel by lead plates 3. In the battery pack described above, battery blocks 10 are connected in series to increase the output voltage. However, battery blocks 10 may be connected in parallel to increase a current capacity, three or more battery blocks 10 may be coupled to circuit board 4 and connected in series or in parallel, or four or more battery blocks 10 may be coupled and connected in series and in parallel.

Thick Structure of Exterior Case 9

As shown in the cross-sectional view of FIG. 2, exterior case 9 has facing part 7 that directly faces circuit board 4 thicker than at least a portion of a non-facing part that is another part. In this way, forming the part directly facing circuit board 4 in the exterior case 9 so as to be relatively thick makes it possible to improve heat resistance and reduce influence on the outside when circuit board 4 reaches a high temperature.

It is required to, when a member reaches a high temperature and catches fire for some reason inside the battery pack, prevent the high temperature and the fire from leaking to the outside of the battery pack. Therefore, in order to increase the safety at such a high temperature and fire, flame-retardant members are used for the exterior case, or the exterior case is made thick to improve the heat insulation performance. However, as the exterior case is made thicker, the weight becomes heavier. In particular, a power supply device for portable electric devices is required to decrease in size and weight. Thus, the improvement in safety and the reduction in size and weight of a power supply device are contradictory characteristics, and it is difficult to achieve both of them at the same time.

Figure 9:
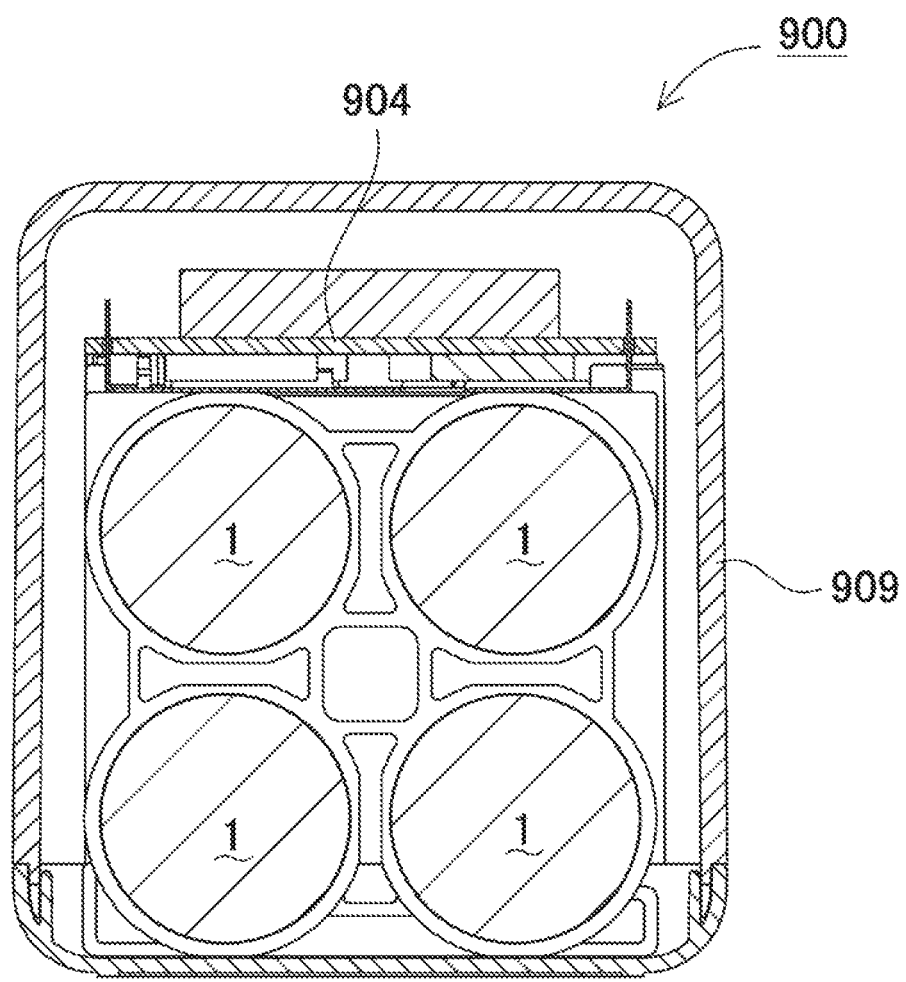
FIG. 9 is a cross-sectional view of a battery pack according to a comparative example.

In a battery pack, it is generally considered that the possibility of ignition is relatively high near the circuit board. Therefore, in the present exemplary embodiment, in order to increase the flame retardancy in the vicinity of circuit board 4, while the thickness of exterior case 9 is ensured, exterior case 9 has thin parts with a relatively low possibility of high temperature and ignition. That is, as in battery pack 900 shown in comparative example of FIG. 9, a thickness of exterior case 909 is not uniform regardless of a positional relationship with circuit board 904 but is partially thinned as shown in FIG. 2 to reduce the weight while ensuring the safety.

As shown in FIG. 2 and the like, in exterior case 9, circuit board 4 and facing part 7 directly facing are in a state of facing without any member interposed between circuit board 4 and an inner surface of exterior case 9. Since heat generation is likely to concentrate on the part directly facing circuit board 4 as described above, forming facing part 7 with a large thickness makes it possible to decrease a risk of a high temperature or fire leaking from exterior case 9 to the outside and causing spread of fire. Facing part 7 is a region close to a plate-shaped edge of circuit board 4. Thickening a region of exterior case 9 close to the edge makes it possible to exhibit resistance to high temperatures.

Exterior case 9 is formed in a prism shape extending in one direction. Inside exterior case 9, circuit board 4 is arranged on an upper surface of battery holder 2 that holds the plurality of secondary battery cells 1 as shown in the cross-sectional view of FIG. 2. Circuit board 4 is arranged in a posture that is substantially parallel to any surface (an upper surface in the cross-sectional view of FIG. 2) of prismatic exterior case 9. A thickness of upper surface side of exterior case 9 is also maintained to be thick so that flame retardancy is exhibited when circuit board 4 generates heat.

Thin Region 6

Further, as shown in the cross-sectional view of FIG. 2, exterior case 9 has flat inner surfaces (left and right surfaces in FIG. 2) that house the battery block and circuit board 4. In this way, an internal space for housing the battery block and circuit board 4 is secured. On the other hand, in the outer surface side exposed to the outside of exterior case 9, at least a portion of the non-facing part is recessed as compared to facing part 7 to form thin region 6. In this way, exterior case 9 is relatively thickened at the part directly facing circuit board 4 and is thinned at the surface of the non-facing part that is another part so that exterior case 9 can has an outer appearance that is not flat but is partially recessed to achieve improvement in design as shown in the perspective view of FIG. 1. In addition, recessed thin region 6 is easy to grip by hand, thereby improving functionality.

Joint Surface 8

Exterior case 9 is divided into first case 9A and second case 9B in the extending direction. Joint surface 8 between first case 9A and second case 9B is located at the non-facing part where circuit board 4 and exterior case 9 do not directly face each other. Thus, separating joint surface 8 between first case 9A and second case 9B from the position facing circuit board 4 makes it possible to, even if circuit board 4 catches fire, prevent leakage of the fire from a gap between first case 9A and second case 9B to the outside of exterior case 9, whereby an effect of enhancing safety can be expected.

In addition, joint surface 8 between first case 9A and second case 9B is preferably formed to be thicker than thin region 6. This increases a mechanical strength of joint surface 8 and improves reliability of the joint between first case 9A and second case 9B. In addition, this reduces occurrence of a gap at the joint interface between first case 9A and second case 9B so that, even if circuit board 4 catches fire, it is possible to prevent the fire from leaking to the outside from joint surface 8. Preferably, joint surface 8 between first case 9A and second case 9B is formed with the same thickness as facing part 7. In other words, it is possible to obtain the advantage that, with the thickness of exterior case 9 kept constant, the non-facing part that is the part with a relatively low necessity for heat-resistant measure is thinned, so that the exterior case 9 can be easily molded.

As described above, by thickening the important parts that are the part directly facing circuit board 4 and joint surface 8 between first case 9A and second case 9B, it is possible to, even if circuit board 4 reaches a high temperature and catches fire inside exterior case 9, make the fire difficult to leak to the outside and enhance safety, and by thinning the other region, it is possible to achieve light weight.

INDUSTRIAL APPLICABILITY

The power supply device of the present invention is suitably used for a battery pack used as a power source for portable electric devices such as vacuum cleaners, electric tools, and power-assisted bicycles.

REFERENCE MARKS IN THE DRAWINGS 100, 900 battery pack
1 secondary battery cell
2 battery holder
2A first battery holder
2B second battery holder
2X fixed surface
3 lead plate
3A first lead plate
3B second lead plate
3C third lead plate
3D fourth lead plate
3E fifth lead plate
4, 904 circuit board
5 terminal part
5x output terminal
5y voltage detection terminal
6 thin region
7 facing part
8 joint surface
9, 909 exterior case
9A first case
9B second case
9a open window
10 battery block
11 insulating plate
13 non-melting plate
16 lead wire
17 closure lid
18 set screw
19 connector
20 core pack
21 holding part
22 holding tube
23 partition wall
25 insertion gap 28 fixing boss
29 fitting convex part
30 locking hook
31 mounting rib
40 connection part unit
41 connection part
42 through-hole
43 fitting concave part

The invention claimed is:

1. A power supply device comprising:
a battery block in which a plurality of secondary battery cells are connected in series and/or in parallel to each other;
a circuit board on which a protection circuit that protects the plurality of secondary battery cells constituting the battery block is mounted; and
an exterior case that houses the battery block and the circuit board,
wherein a facing part of the exterior case that directly faces the circuit board without any member interposed between the facing part and the circuit board is thicker than at least a portion of a non-facing part that is another part of the exterior case,
the facing part and the portion of the non-facing part are both defined by a single, continuous wall that has a flat inner surface and an inclined outer surface, facing inside and outside, respectively, of the exterior case, so as to together form a tapered thickness from the facing part toward the portion of the non-facing part,
the exterior case is divided into a first case and a second case, and
a joint surface between the first case and the second case is positioned at the non-facing part.

2. The power supply device according to claim 1, wherein an inner surface of the exterior case in which the battery block and the circuit board are housed is in a planar shape, and
at least a portion of the non-facing part on an outer surface side of the exterior case exposed to an outside has a thin region that is recessed to be thinner than the facing part.

3. The power supply device according to claim 2, wherein the joint surface between the first case and the second case is thicker than the thin region.

4. The power supply device according to claim 3, wherein the joint surface between the first case and the second case is the same in thickness as the facing part.

5. The power supply device according to claim 1, wherein the exterior case is in a prismatic shape extended in one direction, and
the exterior case is divided into the first case and the second case in the one direction.

6. The power supply device according to claim 1, wherein the facing part is a region close to a plate-shaped end edge of the circuit board.

7. The power supply device according to claim 1, further comprising a battery holder that holds the plurality of secondary battery cells,
wherein the circuit board is placed on one surface of the battery holder.

8. The power supply device according to claim 1, wherein the power supply device is a battery pack that is connected to a portable electric device to supply electric power.

9. The power supply device according to claim 1, wherein the exterior case comprises a rectangular tubular box shape including a pair of opposite side walls each comprising the single, continuous wall defining the facing part and the portion of the non-facing part.

* * * * *